(12) United States Patent
McClendon (10) Patent No.: US 9,147,403 B2
(45) Date of Patent: *Sep. 29, 2015

(54) RESPONDING TO A CALL TO ACTION CONTAINED IN AN AUDIO SIGNAL

(71) Applicant: Hewlett-Packard Development Company, L.P., Houston, TX (US)

(72) Inventor: Philip Scott McClendon, Overland Park, KS (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/715,548

(22) Filed: Dec. 14, 2012

(65) Prior Publication Data

US 2013/0103403 A1    Apr. 25, 2013

Related U.S. Application Data

(63) Continuation of application No. 12/265,515, filed on Nov. 5, 2008, now Pat. No. 8,370,161.

(51) Int. Cl.
| | | |
|---|---|---|
| *G10L 21/00* | (2013.01) | |
| *H04M 1/725* | (2006.01) | |
| *G10L 15/26* | (2006.01) | |
| *H04M 1/27* | (2006.01) | |

(52) U.S. Cl.
CPC .............. *G10L 21/00* (2013.01); *G10L 15/26* (2013.01); *H04M 1/72522* (2013.01); *H04M 1/271* (2013.01); *H04M 1/72547* (2013.01); *H04M 2250/74* (2013.01)

(58) Field of Classification Search
CPC ............ H04M 1/271; H04M 1/72522; H04M 1/72547; H04M 2250/74; H04M 3/4938; G01L 15/265; G01L 21/00; G01L 15/26; G01L 25/00; G06Q 30/02

USPC ............. 379/88.01, 88.04; 709/224; 704/257, 704/270, 270.1, 275, E15.001; 455/556.1, 455/563, 567; 717/127; 340/5.1

See application file for complete search history.

(56) References Cited

U.S. PATENT DOCUMENTS

| | | | |
|---|---|---|---|
| 7,693,720 | B2 | 4/2010 | Kennewick et al. |
| 7,752,152 | B2 | 7/2010 | Paek et al. |
| 8,301,757 | B2 * | 10/2012 | Catlin et al. .................. 709/224 |
| 8,370,161 | B2 * | 2/2013 | McClendon ............... 704/270.1 |
| 8,503,639 | B2 * | 8/2013 | Reding et al. ................. 379/164 |
| 8,503,650 | B2 * | 8/2013 | Reding et al. ............ 379/202.01 |
| 2002/0069060 | A1 * | 6/2002 | Cannavo et al. ............. 704/257 |
| 2004/0193420 | A1 | 9/2004 | Kennewick et al. |
| 2006/0276230 | A1 | 12/2006 | McConnell |
| 2007/0233839 | A1 | 10/2007 | Gaos |
| 2008/0290987 | A1 * | 11/2008 | Li ................... 340/5.1 |
| 2009/0249244 | A1 | 10/2009 | Robinson et al. |
| 2011/0034176 | A1 | 2/2011 | Lord et al. |
| 2011/0143811 | A1 | 6/2011 | Rodriguez |
| 2012/0134480 | A1 * | 5/2012 | Leeds et al. ................ 379/88.12 |

\* cited by examiner

*Primary Examiner* — Vijay B Chawan
(74) *Attorney, Agent, or Firm* — Mahamedi Paradice LLP (57) ABSTRACT

An audio signal is monitored to detect the presence of a call to action contained therein. Addressing information is automatically extracted from the call to action and stored on a storage medium. An electronic message responding to the call to action may be automatically prepared, or a contact field may be automatically populated for inclusion in a contact list. The audio signal may be digitized or obtained from a broadcast transmission, and the process may be performed by a mobile communication device, a central system, or a combination thereof.

20 Claims, 7 Drawing Sheets

RESPONDING TO A CALL TO ACTION CONTAINED IN AN AUDIO SIGNAL

CROSS-REFERENCE TO RELATED APPLICATIONS

This application is a Continuation of U.S. patent application Ser. No. 12/265,515, filed Nov. 5, 2008, titled "RESPONDING TO A CALL TO ACTION CONTAINED IN AN AUDIO SIGNAL", which is incorporated herein by reference in its entirety.

BACKGROUND

This invention relates generally to audio processing, and more particularly, to methods and devices for responding to a call to action contained in an audio signal.

In radio and television broadcasts, calls to action are often included in programming or advertising. A call to action may include an invitation to participate in a vote, subscribe to a service or visit a website. A call to action generally includes addressing information that a listener must use for responding to the call to action, such as a telephone number, SMS code or website URL. To be able to respond to a call to action, a listener must try to record or remember the addressing information. This can be especially difficult if the listener is engaged in another activity while listening, such as driving, working or exercising. A frustrated listener who has missed a call to action that he or she wished to respond to has little choice but to hope that the call to action will be broadcast again.

Speech recognition software programs provided for personal computers or laptops are currently able to recognize spoken words and display them in a word processing program, such as Microsoft Word®. Other speech recognition software programs executable on different platforms are able to respond to predefined keyword instructions. These systems, however, do not include the ability to extract addressing information provided in conjunction with calls to action contained in audio signals.

Thus, there is a need for a means to respond to a call to action contained in an audio signal that allows a listener to retrieve the addressing information and decide whether to initiate further action using the retrieved addressing information.

SUMMARY

Accordingly, the present invention provides a means for automatically responding to a call to action contained in an audio signal. Spoken content is identified in the audio signal and a call to action recognized therein. Addressing information and response content information are extracted from the call to action and stored on a storage medium for later use. Using the stored addressing information and response content information, an electronic message responding to the call to action may be automatically prepared, or a contact field may be automatically populated for inclusion in a contact list.

In one embodiment, the audio signal is monitored by a mobile communication device. The mobile communication device digitizes the audio signal (if required) and buffers the signal to maintain a continuous buffer of the audio signal in a buffer file on a memory of the mobile communication device. A processing module provided on the mobile communication device analyzes the digital audio signal to recognize spoken content therein. A detecting module then detects the presence of a spoken indication of a call to action. In one aspect, responsive to the detecting module detecting a call to action, the mobile communication device transmits at least a portion of the buffer file to a central server. A parsing module at the central server then parses the buffer file to extract addressing information provided in conjunction with the call to action. The parsing module may also extract response content information provided in conjunction with the call to action. A storage module then stores the addressing information and response content information on a storage medium for later use.

The storage medium may be located locally on the mobile communication device, in which case the addressing information and response content information is first transmitted to the mobile communication device by the central server. Alternatively, the storage medium may be remotely provided by a database that may be accessible via a remote terminal through the Internet. Similarly, the parsing module may be provided on the mobile communication device rather than at the central server. Responsive to the detecting module detecting a call to action, the parsing module parses the buffer file to extract addressing information and response content information provided in conjunction with the call to action, and the storage module stores the addressing information and response content information on a memory provided locally on the communication device.

In any of these embodiments, the extracted addressing information and/or response content information can be used in any number of beneficial ways. For example, the addressing information extracted from the audio signal may be used to automatically prepare an electronic message responding to the call to action, thereby facilitating a user's response to the call to action. The response content information can be used to pre-populate the electronic message with relevant content. In another embodiment, the addressing information and response content information may be used to automatically populate a contact field for inclusion in a contact list, thereby allowing the user to initiate a message using the addressing information manually at a later time. The electronic message or contact field may be provided on the electronic communication device or on a database accessible by a website through the Internet.

In another embodiment, the audio signal comprises a broadcast transmission. A central server receives identification information for the broadcast transmission and then tunes to the broadcast transmission to monitor it. The central server then processes and parses the broadcast transmission to detect a call to action in the broadcast transmission and, responsively, to extract addressing information and response content information associated with the detected call to action. The central server then transmits the addressing information and response content information to a mobile communication device or stores the addressing information and response content information on a database that is accessible via a remote terminal through the Internet. Alternatively, instead of processing and parsing the audio signal at the central server, the central server receives the addressing information and response content information associated with a call to action directly from the broadcasting entity, for example, encoded in the broadcast transmission itself or in another related transmission.

The identification information may be sent to the central server by a mobile communication device. In one embodiment, the identification information is obtained by the mobile communication device either by recording the frequency, channel, or name of the broadcast transmission (e.g., in the case where the receiver of the broadcast transmission is an antenna of the mobile communication device), or by obtaining a digital fingerprint for a portion of the broadcast transmission (e.g., in the case where the receiver of the broadcast transmission is the microphone of the mobile communication device). The extracted addressing information and response content information can be used to automatically prepare an electronic message responding to the call to action or to automatically populate a contact field for inclusion in a contact list. The electronic message or contact field may be provided on the electronic communication device or on a database accessible by a website through the Internet.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The invention provides a means for automatically responding to a call to action contained in an audio signal. An audio signal includes any signal that carries audio data, including but not limited to sound waves or analog or digital radio or television broadcasts. A call to action may include any invitation to communicate or interact with any person or entity, including a request to participate in a vote, subscribe to a service, respond to a poll, obtain a coupon, visit a website or contact an advertiser for a special offer. A call to action also includes or is otherwise associated with addressing information that allows a person to fulfill the call to action. This addressing information is typically provided in conjunction with the name of the communicating entity, for example the name of a business followed by a telephone number. The addressing information will depend on the type of communication is being requested by the call to action, such as a telephone number to make a phone call, or a number for sending a text (e.g., SMS) message.

Response content information may also be provided in conjunction with the call to action. Response content information includes any information that a listener is requested to include in a communication or that a user may wish to associate with the addressing information. For example, in the following call to action, "To subscribe, text the word PATENT to 1122334", the word "patent" would be response content information. The name of a communicating entity could also be response content information.

Figure 1A:
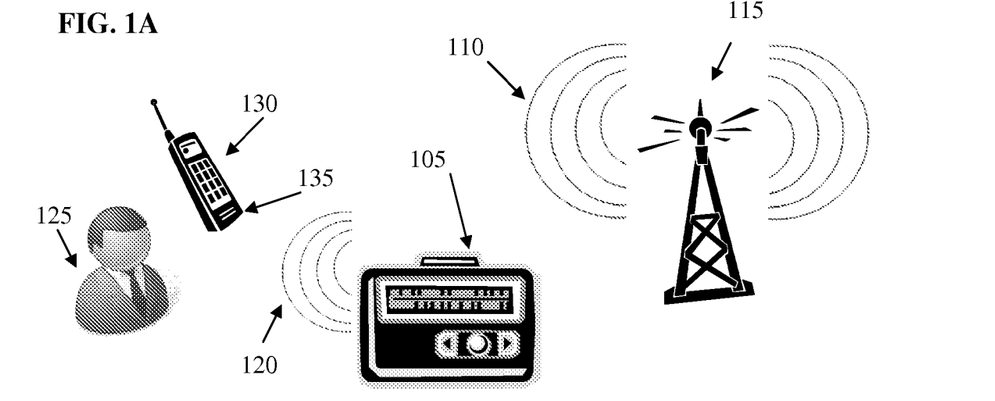
FIGS. 1A through 1C are schematic diagrams of various example arrangements by which an audio signal may be monitored.
Figure 1B:
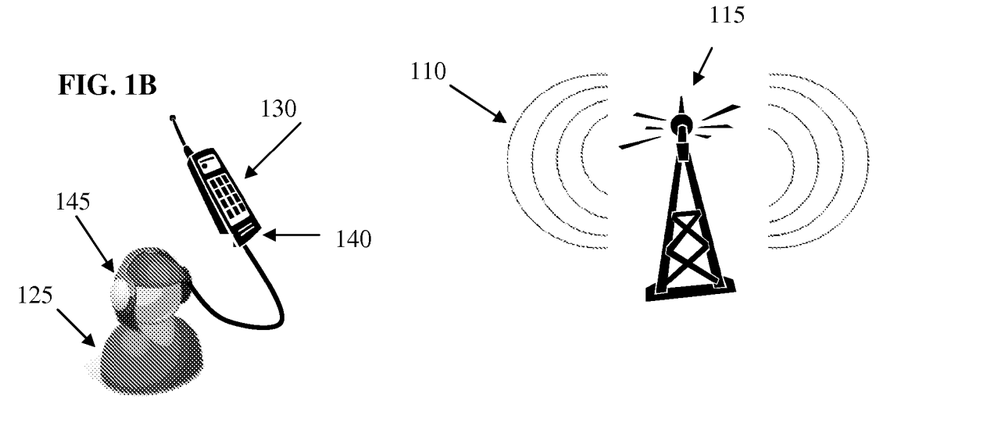
Figure 1C:
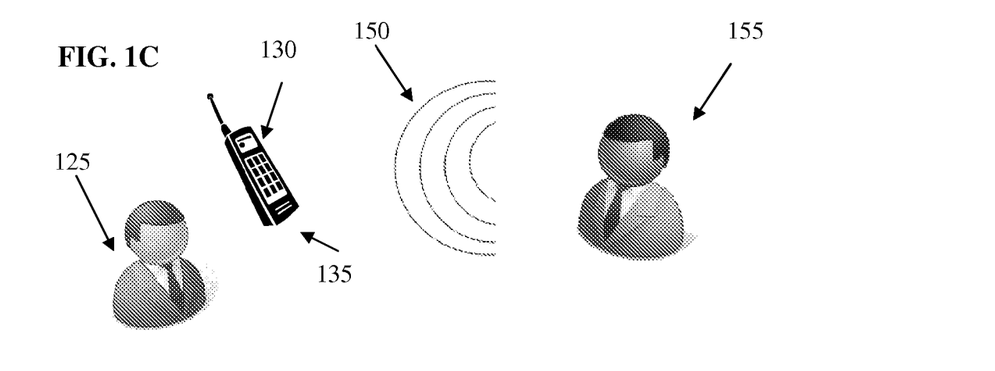

FIGS. 1A through 1C shows example ways in which an audio signal may be monitored. In FIG. 1A, a radio receiver 105 receives a modulated analog or digital over-the-air radio signal 110 transmitted by a broadcaster 115. The radio receiver 105 demodulates the radio signal and plays an audio signal 120 through its speakers to a listener 125 who can hear it. The radio receiver 105 may be a free standing radio player or may be integral with any other device or equipment, such as a built-in car radio player. The listener 125 carries a mobile communication device 130 which is also able to receive the audio signal 120 through a microphone 135 built into the device. The mobile communication device 130 may be a cellular telephone, personal digital assistant, mini computer or any other portable electronic communication device.

FIG. 1B shows another way in which an audio signal may be monitored. In FIG. 1B, a radio receiver 140 is built into the mobile communication device 130. The mobile communication device 130 is thus able to directly receive the radio signal 110 and play an audio signal to the listener 125, for example through headphones 145. Instead of a radio broadcast, the broadcast shown in FIGS. 1A and 1B could be a television or multimedia broadcast, in which case a television set or built-in media player will replace the example of a radio receiver.

FIG. 1C shows yet another way in which an audio signal may be monitored. In FIG. 1C, the audio signal is a sound wave 150 emanating from a communicating person 155. The sound wave 150 could be amplified by loudspeaker or sound equipment, and the communicating person 155 could be engaged in a face-to-face conversation with the listener 125. As in FIG. 1A, a microphone 135 of the mobile communication device is able to receive the sound wave 150.

It will be appreciated that the alternatives shown in FIGS. 1A through 1C are merely examples and are not intended to limit the ways in which an audio signal could be monitored. For example, instead of the signal being monitored by a mobile communications device 130 and/or a listener 125, the signal could be monitored by a central server. Any means of monitoring a signal that carries audio data is included within the scope of the invention.

Figure 2:
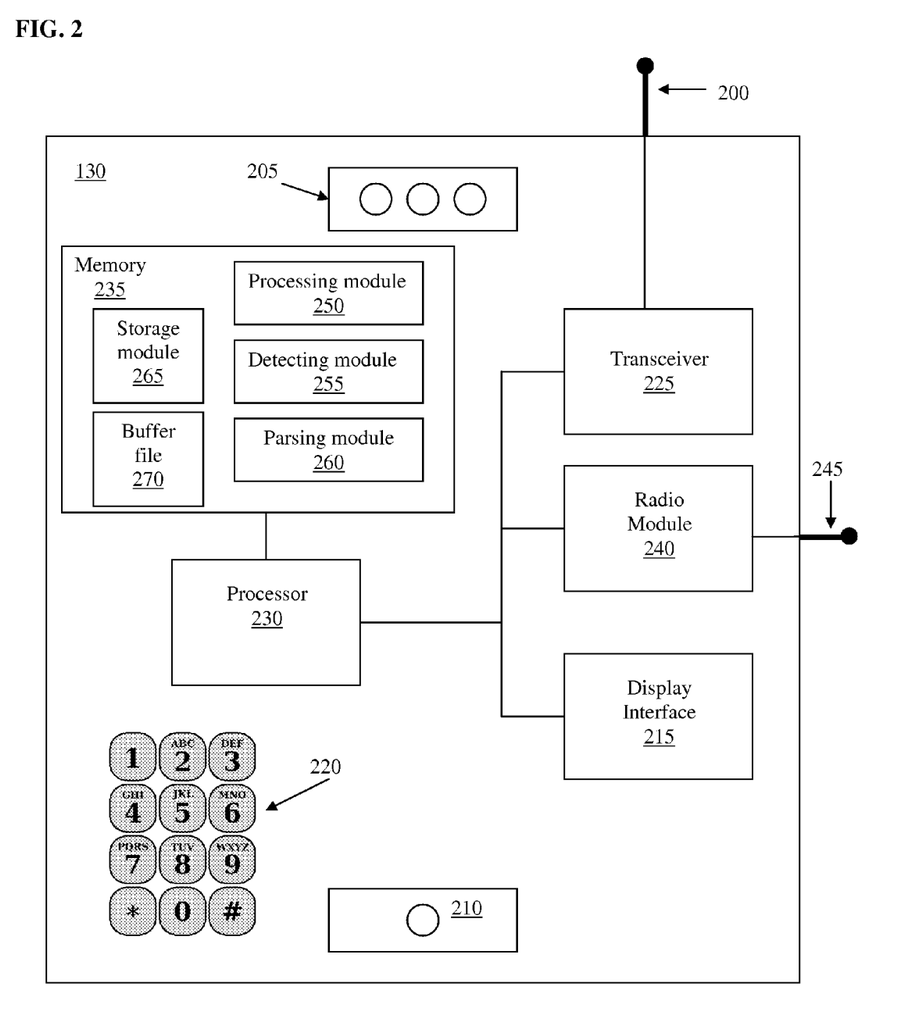
FIG. 2 is a schematic representation of a mobile communication device.

FIG. 2 is a schematic representation of the mobile communication device 130 programmed to operate according to the invention. The mobile communication device 130 includes a receiver, which in this case includes an antenna 200 and a microphone 210, a speaker 205, display interface 215 and an input interface 220. A transceiver 225 is operable to receive and transmit data by means of the antenna 200. The mobile communication device also includes a processor 230 for controlling the operation of the device, and a memory 235. An optional radio module 240 is also shown. The radio module 240 could be implemented in software under control of the processor or could be a stand-alone unit. The radio module 240 could receive radio signals from the transceiver 225 or via a separate radio antenna 245.

Various software modules may be stored on the memory 235 and implemented by the processor 230. The software modules may include a processing module 250, a detecting module 255, a parsing module 260 and a storage module 265. A buffer file 270 may also be stored on the memory 235.

Figure 3:
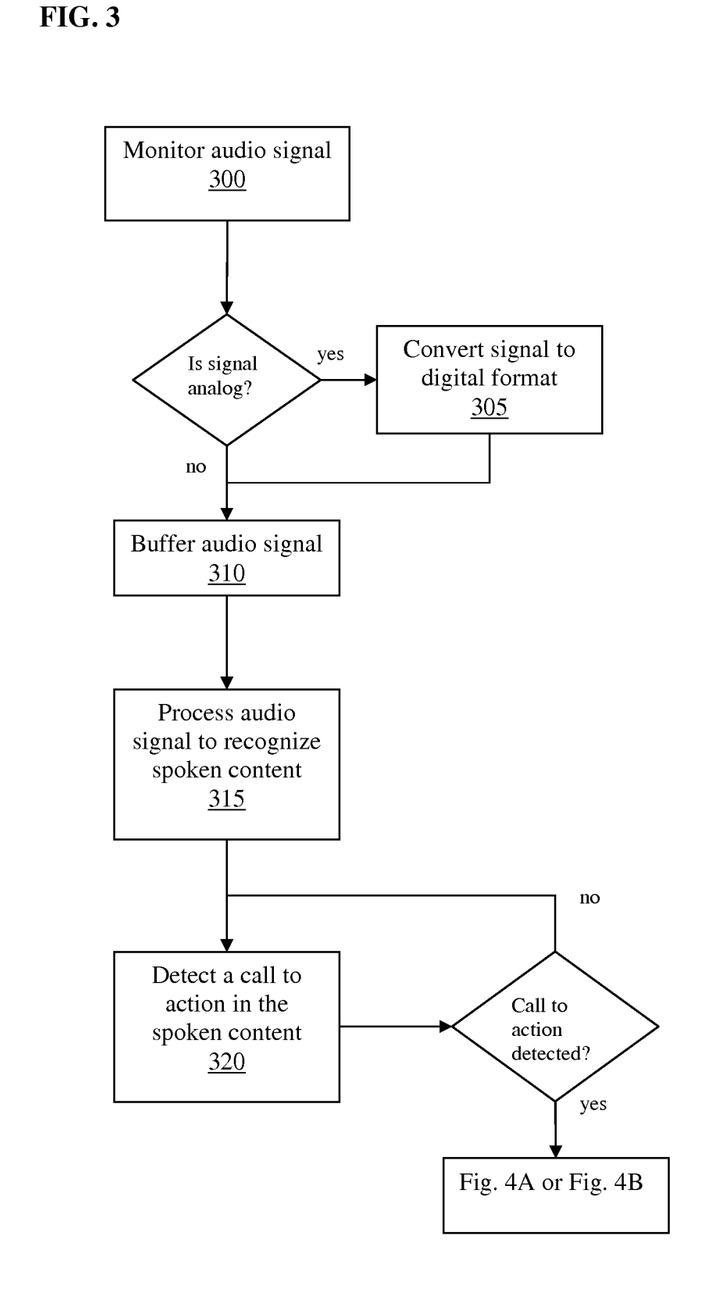
FIG. 3 is a flow diagram of a method for detecting a call to action in an audio signal, according to an embodiment of the invention.

FIG. 3 shows a flow diagram of a method according to the invention. The illustrated method may be implemented by the processor 230 under the control of the various software modules. Beginning at block 300, an audio signal is monitored by a receiver of the mobile communication device 130. The audio signal may be a modulated signal received by the antenna 200, or the audio signal may be a sound wave that is detected by the microphone 210 and converted into an electrical signal. If the signal is a sound wave or other analog signal, the audio signal may be converted into digital format as shown at block 305. Dedicated circuitry may be provided for performing the analog to digital conversion. Alternatively, the analog to digital conversion can be implemented in software by the processor 230 according to known techniques. If the received signal is already digital, for example if the signal is a digital radio signal, no analog to digital conversion is required. Next, at block 310, the audio signal is buffered by storing a predetermined number of bytes of the signal in the buffer file 270 on the memory 235 of the mobile communication device 130. The buffer may be continuous, so that new data received continually replaces older data in the buffer file 270. In this way, the buffer file 270 stores a predetermined number of seconds of audio data contained within the audio signal.

Next, at block 315, the buffered audio signal is processed by the processing module 250. The processing module 250 is configured to recognize spoken content contained in the audio signal according to known techniques. Examples of technology for recognizing spoken content in an audio signal include software programs for performing voice recognition typing, or software programs that permit voice-activated control of an electronic device.

Then, as shown at block 320, calls to action contained in the spoken content are detected by the detecting module 255. One way in which a call to action can be detected by the detecting module 255 is by comparing the recognized spoken content with a predefined list of spoken indications of a call to action that are stored on the memory 235. Spoken indications of a call to action may include spoken words such as "contact", "call", "text", "visit", "send" or any other spoken invitation to interact with an entity. An indication of a call to action may also include a string of characters designating a telephone number, a zip code, a URL prefix or suffix (such as "www" or ".com"), or any other indication that addressing information is being supplied. The buffer file 270 is continually analyzed for spoken indications of a call to action. Upon detection of a spoken indication of a call to action, further steps are carried out to obtain addressing information and possible response content information associated with the call to action.

Figure 4A:
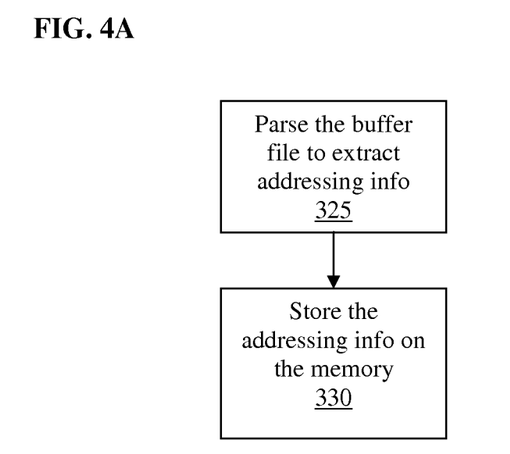
FIGS. 4A and 4B are flow diagrams of alternative embodiments for extracting addressing information associated with a call to action detected in the method of FIG. 3.
Figure 4B:
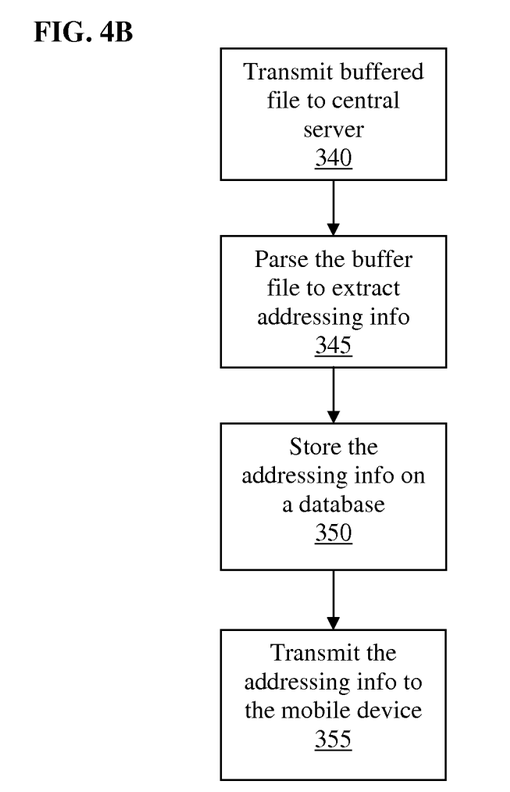

Once a spoken indication of a call to action is detected, two alternatives are shown in FIGS. 4A and 4B for the subsequent steps of the method of FIG. 3. In FIG. 4A, the buffer file is parsed by the parsing module 260 to extract addressing information associated with the call to action, as shown at block 325. The parsing module 260 may also extract any response content information associated with the call to action. Next, at block 330, the addressing information and response content information is stored on the memory 235 of the mobile communication device 130 by the storage module 265.

The stored addressing information can be used to prepare an electronic message responding to the call to action. The electronic message could be an e-mail, SMS or multimedia message displayed on the mobile communications device. The response content information can be used for pre-populating the electronic message with relevant content. Alternatively, instead of preparing an electronic message, the addressing information and response content information can be used to populate a contact field for inclusion in a contact list, such as an address book of the mobile communications device 130 that is stored on the memory 235. The addressing information and/or response content information could be used for many other uses, including opening a web-browser to visit a webpage, initiating a voice call or pinpointing the location of a physical address on a virtual map.

Figure 5:
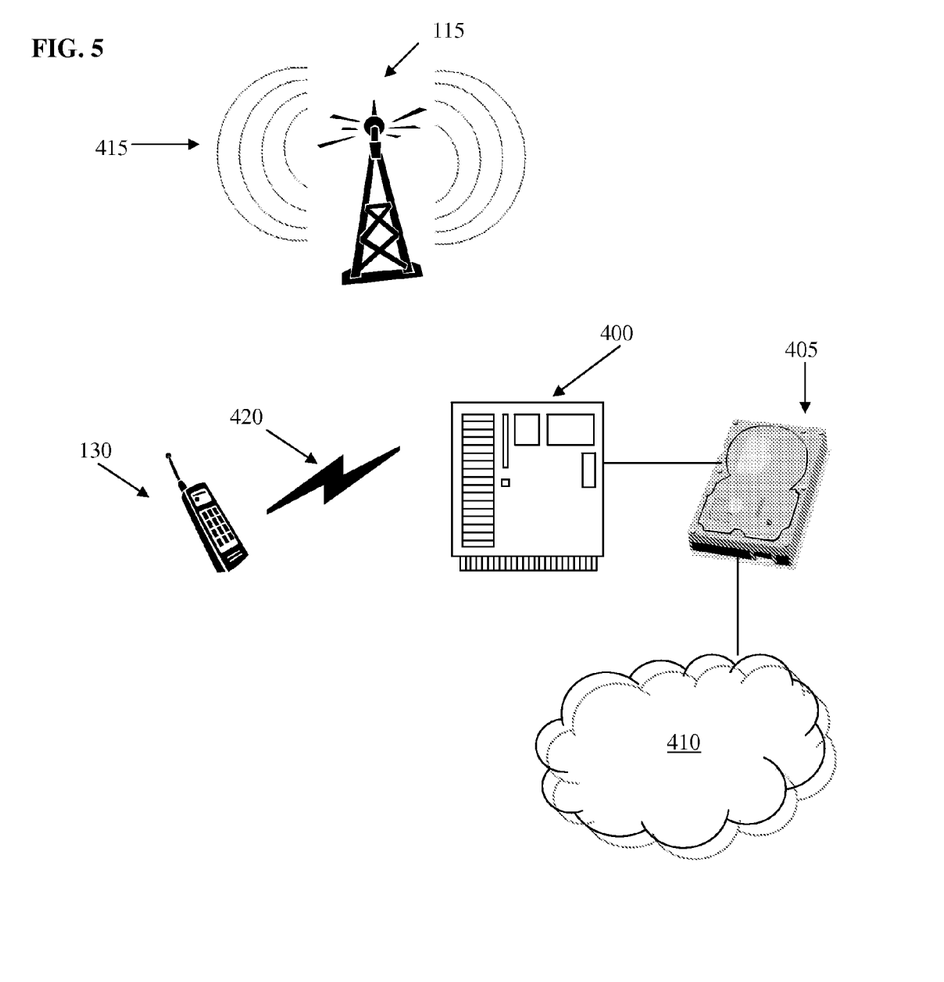
FIG. 5 is a schematic diagram of a system for detecting addressing information associated with a call to action in a broadcast transmission using a central server, in accordance with another embodiment of the invention.

FIG. 4B shows an alternative for the subsequent steps of the method of FIG. 3. In FIG. 4B, the buffer file 270 is transmitted by the mobile communication device 130 to a central server 400, as shown at block 340. The central server 400 is illustrated in FIG. 5. The central server 400 then carries out the step of parsing the buffer file to extract addressing and response content information, as indicated at block 345. In this case, the parsing is carried out by a parsing module on the central server 400. Next, at block 350, the central server 400 stores the addressing information and response content information on a database 405. The database 405 may be accessible by means of a remote terminal over the Internet 410. The parsing and storing steps carried out by the central server 400 may be implemented by means of software modules stored on a memory of the central server 400.

Optionally, as shown at step 355, the central server 400 may transmit the extracted addressing information and response content information back to the wireless communication device 130, which may use the addressing information and response content information to prepare an electronic message or populate a contact field as previously described.

It will be appreciated that one advantage of the method illustrated in FIG. 4B is that the step of parsing the buffer file 270, which can be processor intensive, occurs on the central server 400 where a more powerful processor is generally available than on the mobile communication device 130. On the other hand, advantages of the method illustrated in FIG. 4A are that less bandwidth is used for exchanging data between the mobile communication device 130 and the central server 400 or reduced latency in the response because it was processed locally on the mobile communication device 130. Thus, depending on factors like the power of the processor 230 and the speed or cost of the data connection between the device and the central server, one or the other method may be preferable.

Accordingly, the mobile communication device 130 is operable to automatically detect a call to action contained in an audio signal, extract the addressing information and response content information associated with the call to action, and then automatically prepare an electronic message responding to the call to action or populate a contact field for inclusion in a contact list of the device. In one example use of embodiments of the invention, the listener 125 may activate a software program on the mobile communication device 130 to cause the device to monitor a broadcast radio signal while the listener is driving or exercising. For each call to action transmitted in the broadcast, the device either prepares a message responding to the call to action or populates a contact field for inclusion in a contact list. At the end of the broadcast transmission, or at any point during the transmission, the listener is able to review the list of messages and/or contact fields captured by the device. The listener can then either discard the contacts or include them in an address book stored on the memory of the device, and can choose to either discard the automatically prepared messages or transmit them. In this way, a mobile communication device programmed to operate according to the invention overcomes the problem of a listener not being able to record or remember the addressing information contained in a call to action to which the listener wishes to respond. The invention provides a convenient way for recording or responding to these calls to action.

FIG. 5 illustrates a schematic diagram of another general embodiment of the invention. In FIG. 5, the audio signal is a broadcast transmission 415, such as a radio or television broadcast, which is transmitted by a broadcaster 115 and received by the mobile communication device 130. The broadcast transmission 415 can either be received directly by the mobile communication device 130 as described with reference to FIG. 1B, or can be received by the microphone of the mobile communication device 130 as described with reference to FIG. 1A. The mobile communication device 130 is able to wirelessly communicate with a central server 400 through a wireless link 420. The central server 400 is coupled to a database 405 which may be accessible through the Internet 410 as will be further described herein.

Figure 6:
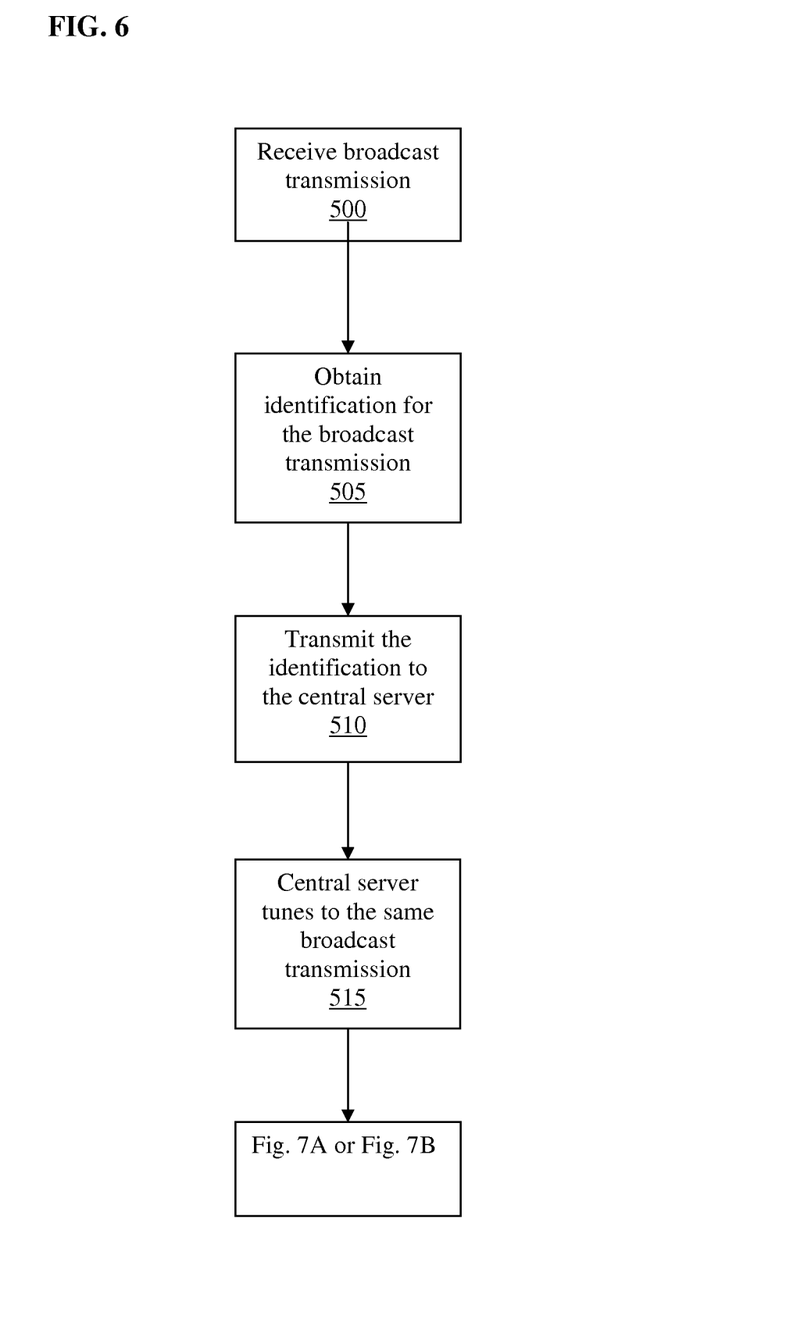
FIG. 6 is a flow diagram of a method for identifying to a central server a broadcast transmission being listened to by a local device, according to an embodiment of the invention.

Referring now to FIG. 6, which is a flow diagram that illustrates a method according to the embodiment of FIG. 5, the mobile communication device 130 receives the broadcast transmission 415 as shown at block 500. Next, the device obtains identification information for the broadcast transmission 415 at block 505. Identification information could include the frequency of the channel or station received by the mobile communication device 230 in the case where the broadcast transmission 415 is received directly by the radio module 240 of the device, or may include a characteristic digital fingerprint for a portion of the broadcast transmission 415 in the case where the broadcast transmission 415 is received by the microphone 210 of the mobile communication device 130. Digital fingerprints may be generated by known methods. The identification information is generated by an identification module implemented in software by the processor 230.

Next, at block 510, the mobile communication device 130 transmits the identification information to the central server 400 through the wireless link 420. The central server 400 then uses the identification information to tune to the same broadcast transmission 415 received by the mobile communication device, as shown at block 515.

Figure 7A:
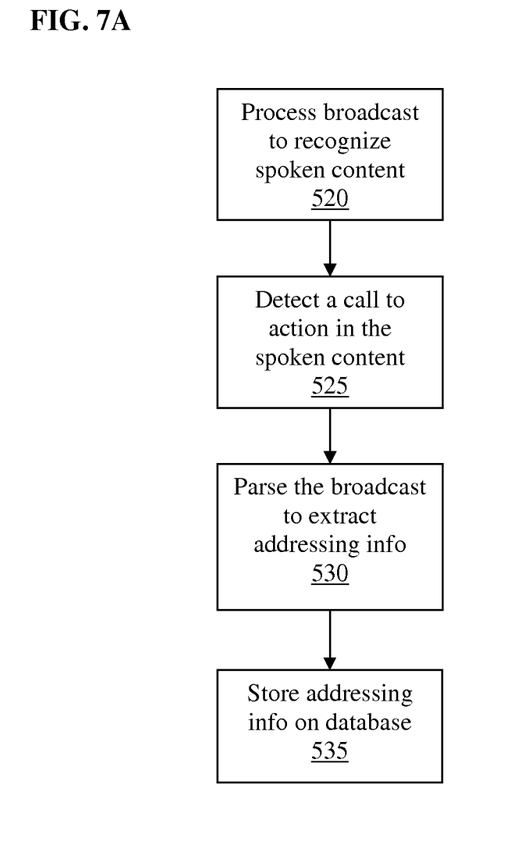
FIGS. 7A and 7B are flow diagrams of alternative embodiments for obtaining addressing information associated with a call to action in the broadcast transmission identified in the method of FIG. 6.
Figure 7B:
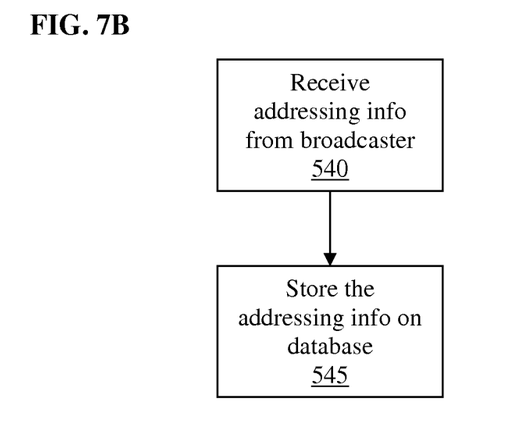

FIGS. 7A and 7B show two alternatives for the subsequent steps of the method of FIG. 6. In FIG. 7A, the central server 400 processes the broadcast transmission 415 to recognize spoken content therein as shown at block 520, and then detects a call to action contained in the spoken content as shown at block 525. The processing and detection steps are carried out by processing and detection modules at the central server 400. Next, at block 530, the central server 400 parses the broadcast transmission 415 to extract the addressing information and response content information therefrom. The parsing is carried out by a parsing module at the central server 400. Finally, as shown at block 535, the central server stores the addressing information and response content information in the database 405.

In FIG. 7B, instead of processing and parsing the broadcast transmission 415, the central server 400 receives the addressing information and/or response content information directly from the broadcaster 115, as shown at block 540, and then stores the addressing information and response content information in the database 405 as shown at block 545. This second alternative may require a preexisting arrangement to be established between the entity responsible for managing the system of the invention and the entity responsible for transmitting the broadcasts. In this arrangement, the broadcasting entity may supply all of the broadcast contact information to the entity responsible for managing the system of the invention. The broadcast contact information could be transmitted by the broadcasting entity either by encoding it in the broadcast transmission or by sending it another related transmission. This arrangement has the significant advantage that the addressing information and response content information obtained is likely to be far more accurate and reliable than in case where the system must analyze and extract the information from spoken content in the broadcast audio signal.

Instead of, or in addition to, storing the addressing information and response content information on the database 405, the central server 400 may transmit the addressing information and response content information to the mobile communication device 130 through the wireless link 420. The addressing information and response content information can then be used by the mobile communication device 130 to prepare an electronic message responding to the call to action or to populate a contact field for inclusion in a contact list, as has been described herein.

Where the addressing information and response content information is not transmitted to the mobile communication device 130, in one embodiment, the addressing information and response content information stored on the database 405 is presented to the listener 125 by means of a terminal that can access the database 405 through the Internet 410. In this embodiment, the list of messages and/or contact fields is presented to the listener by a website. For example, the listener may visit a specified website and input login information to access a secure area of the website where the list of messages and/or contact fields will be displayed. The listener can then decide whether to discard each contact or include the contact in an address book implemented on the website, and can either choose to discard or transmit each automatically prepared message. The website may be configured to emulate the listener's mobile communication device, so that a message sent by means of the website appears to the recipient to have been sent from the mobile communication device. The website may permit e-mail or SMS messages to be transmitted. This embodiment has the advantage that a listener's mobile communication device is not bombarded by a multitude of separate draft messages or contact fields; the listener can instead visit a website and deal with all the captured address information at the same time.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, in one broad embodiment it is not even necessary that a listener use a mobile communication device or even actively listen to a broadcast audio signal. According to this aspect of the invention a listener could log in to a website hosted by the central server, select from a list one or more broadcast channels which the listener desires to monitor for calls to action, and later retrieve the automatically prepared messages and/or the populated contact fields by means of the website.

Some portions of this description describe the embodiments of the invention in terms of symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

As used herein, the term "storing the addressing information" includes storing the addressing information in permanent memory or in RAM, and includes any means, however ephemeral, for keeping the addressing information for further use, including transmitting the addressing information to another location or entity for remote storage.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for processing an audio signal, the method performed by one or more processors of a mobile computing device and comprising:
   receiving the audio signal from a broadcast;
   processing the audio signal to recognize spoken content;
   detecting a call to action in the spoken content, the detected call to action corresponding to an invitation to initiate communications with an entity associated with the audio signal;
   parsing the detected call to action to extract addressing information for the entity; and
   automatically preparing an electronic message responding to the call to action using the extracted addressing information.

2. The method of claim 1, wherein detecting the call to action includes identifying, in the spoken content, predefined words indicative of the invitation to initiate communications with the entity.

3. The method of claim 1, further comprising:
   determining response content from the detected call to action; and
   generating the response content in the electronic message.

4. The method of claim 1, further comprising automatically creating a contact entry for the entity using the extracted addressing information.

5. The method of claim 1, further comprising storing the extracted addressing information in a memory resource.

6. An apparatus for processing an audio signal, the apparatus comprising one or more processors to:
   receive the audio signal from a broadcast;
   process the audio signal to recognize spoken content;
   detect a call to action in the spoken content, the detected call to action corresponding to an invitation to initiate communications with an entity associated with the audio signal;
   parse the detected call to action to extract addressing information for the entity; and
   automatically prepare an electronic message responding to the call to action using the extracted addressing information.

7. The apparatus of claim 6, wherein the one or more processors detect the call to action by identifying, in the spoken content, predefined words indicative of the invitation to initiate communications with the entity.

8. The apparatus of claim 6, wherein the one or more processors also:
   extract response content from the detected call to action; and
   automatically prepare the electronic message responding to the call to action using the response content.

9. The apparatus of claim 6, wherein the one or more processors extract the addressing information by comparing the spoken content with a predefined set of character strings.

10. The apparatus of claim 9, wherein the predefined set of character strings includes a string of characters that designates at least one of a telephone number, a zip code, a URL prefix, or a URL suffix.

11. A non-transitory computer-readable medium storing instructions that, when executed by one or more processors of a computing device, cause the computing device to perform operations comprising:
    processing an audio signal received from a broadcast to recognize spoken content;
    detecting a call to action in the spoken content, the detected call to action corresponding to an invitation to initiate communications with an entity associated with the audio signal;
    parsing the detected call to action to extract addressing information for the entity; and
    automatically preparing an electronic message responding to the call to action using the extracted addressing information.

12. The non-transitory computer-readable medium of claim 11, wherein detecting the call to action includes identifying, in the spoken content, predefined words indicative of the invitation to initiate communications with the entity.

13. The non-transitory computer-readable medium of claim 11, wherein the instructions, when executed by the one or more processors of the computing device, cause the computing device to perform further operations comprising:
    determining response content from the detected call to action; and
    generating the response content in the electronic message.

14. The non-transitory computer-readable medium of claim 11, wherein the instructions, when executed by the one or more processors of the computing device, cause the computing device to perform further operations comprising:
    automatically creating a contact entry for the entity using the extracted addressing information.

15. The non-transitory computer-readable medium of claim 11, wherein the instructions, when executed by the one or more processors of the computing device, cause the computing device to perform further operations comprising:
    storing the extracted addressing information in a memory resource.

16. A mobile computing device comprising:
   means for receiving an audio signal from a broadcast;
   means for processing the audio signal to recognize spoken content;
   means for detecting a call to action in the spoken content, the detected call to action corresponding to an invitation to initiate communications with an entity associated with the audio signal;
   means for parsing the detected call to action to extract addressing information for the entity; and
   means for automatically preparing an electronic message responding to the call to action using the extracted addressing information.

17. The mobile computing device of claim 16, wherein the means for detecting the call to action includes means for identifying, in the spoken content, predefined words indicative of the invitation to initiate communications with the entity.

18. The mobile computing device of claim 16, further comprising:
   means for determining response content from the detected call to action; and
   means for generating the response content in the electronic message.

19. The mobile computing device of claim 16, further comprising means for automatically creating a contact entry for the entity using the extracted addressing information.

20. The mobile computing device of claim 16, further comprising means for storing the extracted addressing information in a memory resource.

* * * * *